(12) United States Patent
Jones et al.

(10) Patent No.: US 6,413,593 B1
(45) Date of Patent: Jul. 2, 2002

(54) LIQUID CRYSTAL COMPOSITION AND LIQUID CRYSTAL SHUTTER

(75) Inventors: John C Jones; Andrew J Slaney; Victoria Minter, all of Malvern (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 09/529,167

(22) PCT Filed: Nov. 10, 1998

(86) PCT No.: PCT/GB98/03361

§ 371 (c)(1),
(2), (4) Date: Apr. 10, 2000

(87) PCT Pub. No.: WO99/25789

PCT Pub. Date: May 27, 1999

(30) Foreign Application Priority Data

Nov. 13, 1997 (GB) .............................. 9723949

(51) Int. Cl.$^7$ ...................... C09K 19/34; C09K 19/12; G02F 1/133
(52) U.S. Cl. ............... 428/1.1; 252/299.61; 252/299.66
(58) Field of Search ....................... 252/299.01, 299.61, 252/299.63, 299.66; 428/1.1

(56) References Cited

U.S. PATENT DOCUMENTS

| | | | | |
|---|---|---|---|---|
| 5,507,975 | A | * 4/1996 | Koden et al. | 252/299.61 |
| 5,820,786 | A | * 10/1998 | Sage et al. | 252/299.66 |
| 6,251,301 | B1 | * 6/2001 | Sage et al. | 252/299.6 |
| 6,280,653 | B1 | * 8/2001 | Jones et al. | 252/299.61 |

FOREIGN PATENT DOCUMENTS

| | | |
|---|---|---|
| EP | 0 360 043 A1 | 3/1990 |
| EP | 0 414 230 A2 | 2/1991 |
| EP | 0 414 230 A3 | 2/1991 |
| WO | 89/02425 | 3/1989 |
| WO | 95/16760 | 6/1995 |

* cited by examiner

Primary Examiner—Shean C. Wu
(74) Attorney, Agent, or Firm—Nixon & Vanderhye

(57) ABSTRACT

A liquid crystal composition includes a host material comprising (a) two or more phenylpyrimidinyl compounds of general formula (I), wherein $X_1$ and $X_2$ are independently selected from the group consisting of straight or branched chain ($C_1$–$C_{12}$)alkyl, straight or branched chain ($C_1$–$C_{12}$) alkenyl and straight or branched chain ($C_1$–$C_{12}$)alkoxy, in which either or both of the alkyl, alkenyl or alkoxy groups may be substituted by one or more of halogen, oxygen and siloxane, and (b) at least one fluoroterphenyl compound of formula (II) or (III), wherein $Y_1$ et $Y_2$ are independently selected from the group consisting of straight or branched chain ($C_1$–$C_{12}$)alkyl, straight or branched chain ($C_1$–$C_{12}$) alkenyl and straight or branched chain ($C_1$–$C_{12}$)alkoxy, and wherein either or both of the alkyl, alkenyl or alkoxy groups may be substituted by one or more of halogen, oxygen and siloxane.

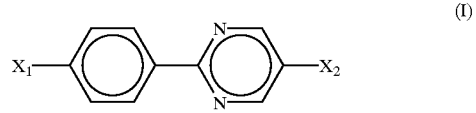

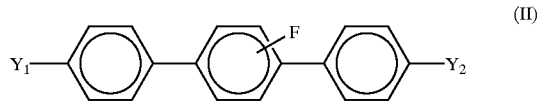

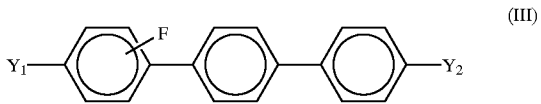

18 Claims, 2 Drawing Sheets

LIQUID CRYSTAL COMPOSITION AND LIQUID CRYSTAL SHUTTER

CROSS-REFERENCE TO RELATED APPLICATIONS

This application is the U.S. national phase of international application PCT/GB98/03361, filed Nov. 10, 1998 which designated the U.S.

The present invention relates to a liquid crystal composition and a liquid crystal shutter arrangement containing such a composition, for example a liquid crystal display device including a multiplicity of liquid crystal shutters.

BACKGROUND OF THE INVENTION

Liquid crystal devices having liquid crystal layers including ferroelectric liquid crystal compositions are the subject of active research interest. In the production of such devices, the liquid crystal layer is formed by introducing the liquid crystal composition at an elevated temperature so as to cause it to be in the isotropic (or nematic), free flowing phase into a narrow gap (the cell gap) between a pair of substrates. At this stage, the liquid crystal composition is at a temperature somewhat higher than its operating temperature. The liquid crystal composition is then cooled in a controlled manner until an optically active tilted smectic phase is achieved, typically the smectic C phase, SmC*, (the * denotes chirality or optical activity). In order for the liquid crystal composition to have the required advantageous properties, it is desired for it to pass from the isotropic phase (I) through chiral nematic (N*) and smectic A (SmA) phases before reaching the operative smectic C* phase. This is referred to as an I-N*-SmA-SmC* phase sequence. The temperature ($T_{A-C}$) at which the transition from the SmA phase to the SmC* phase affects the working temperature range over which the device can operate. Thus, a low $T_{A-C}$ effectively reduces the working temperature range of the device.

Liquid crystal compositions commonly comprise a host material such as those based on mixtures of two or more phenylpyrimidinyl compounds exhibiting or capable of exhibiting a smectic C phase, and optionally other materials which may be included to modify the properties of the host material, for example a chiral dopant to impart chirality if the host material is not inherently chiral, or to enhance or induce formation of certain phases in the phase sequence.

A liquid crystal composition has been proposed in which the host material is based on a 1:2 by weight mixture of the compounds [Ia] and [Ib]) below:

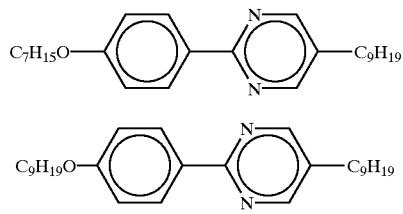

Such a host material is formulated to have a low dielectric biaxiality and a low switching viscosity so that, in compositions containing a chiral dopant, a high value of Ps/δε (spontaneous polarisation/dielectric biaxiality can be obtained. However, this material has a low $T_{A-C}$, 54° C., even before mixing with chiral dopant (which can suppress $T_{A-C}$).

It is an object of the present invention to provide a liquid crystal composition having an improved $T_{A-C}$.

BRIEF DESCRIPTION OF THE DRAWINGS

The invention is further illustrated in the appended drawings in which.

DESCRIPTION OF THE INVENTION

Figure 1:
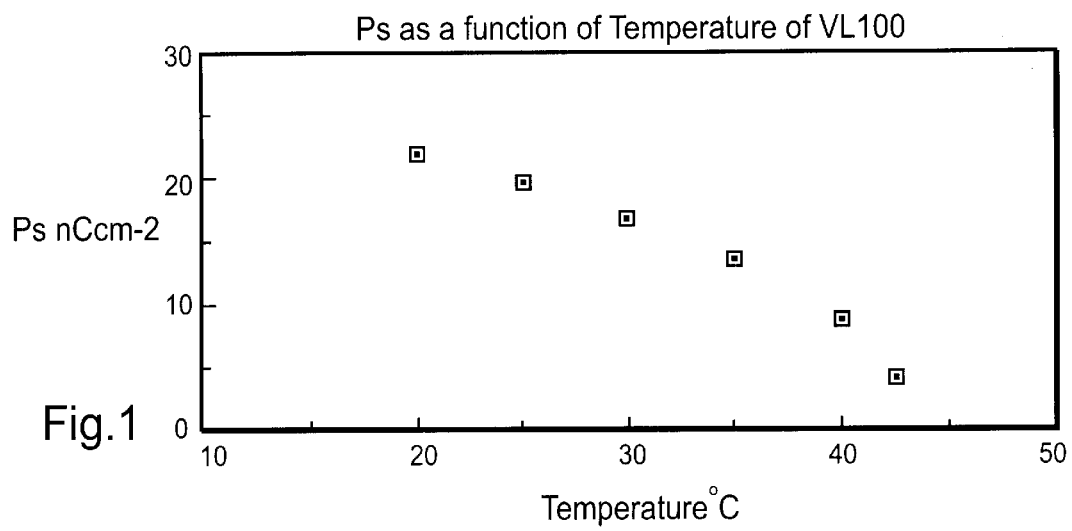
FIG. 1 is a graph plotting spontaneous polarization (Ps) as function of temperature for mixture VL100.
Figure 2:
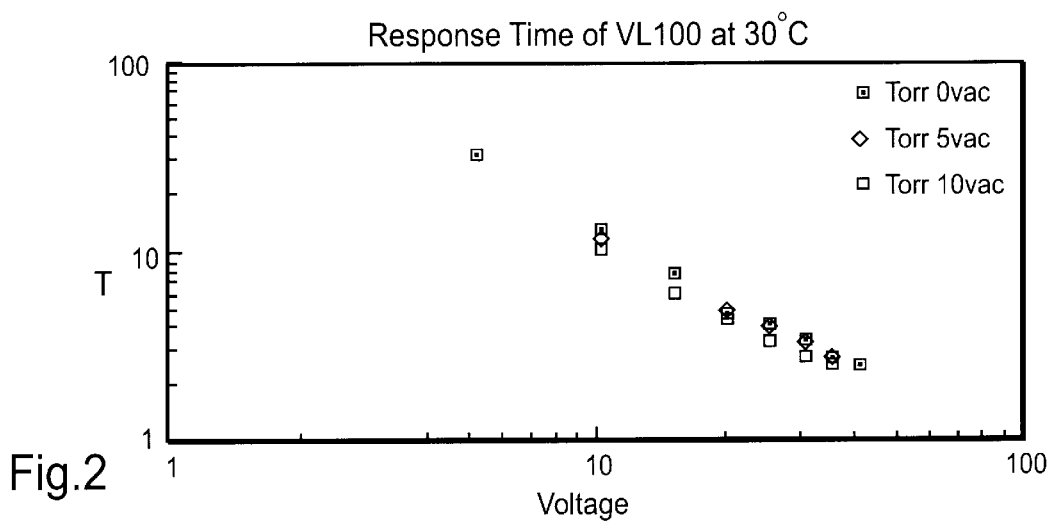
FIG. 2 is a graph plotting the response time against voltage for mixture FL100 at 30° C.
Figure 3:
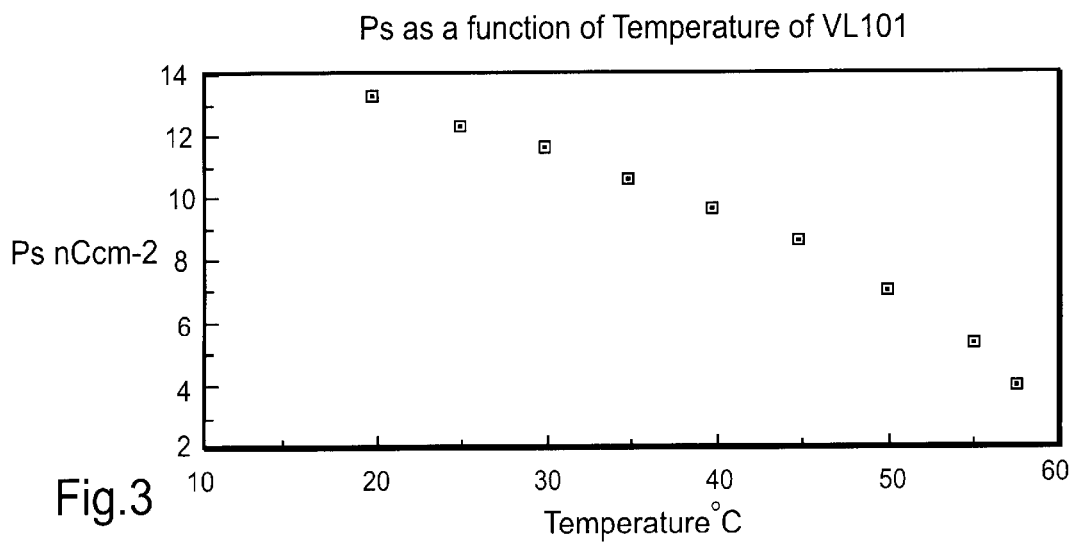
FIG. 3 is a graph plotting Ps as a function of temperature for mixture VL101.
Figure 4:
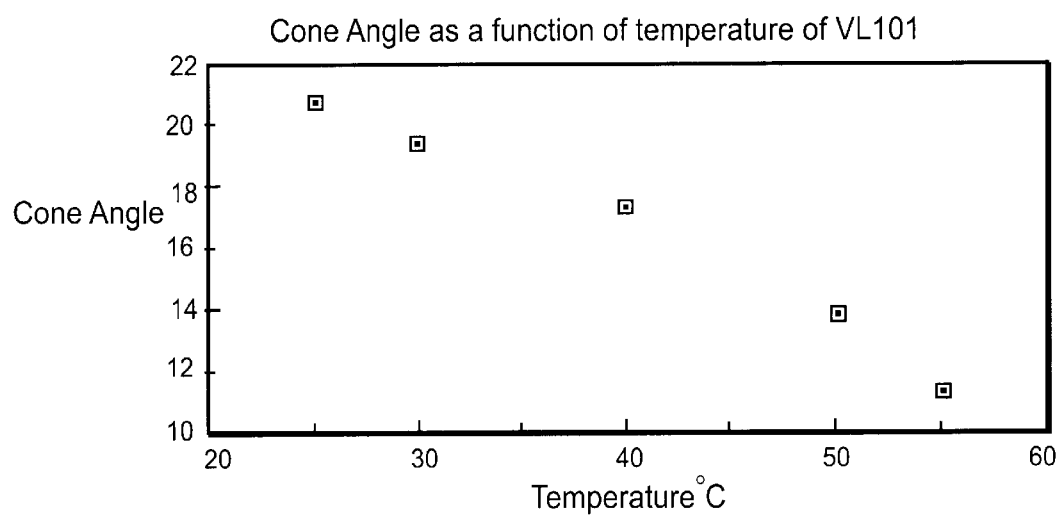
FIG. 4 is a graph plotting cone angle as a function of temperature for mixture VL101.
Figure 5:
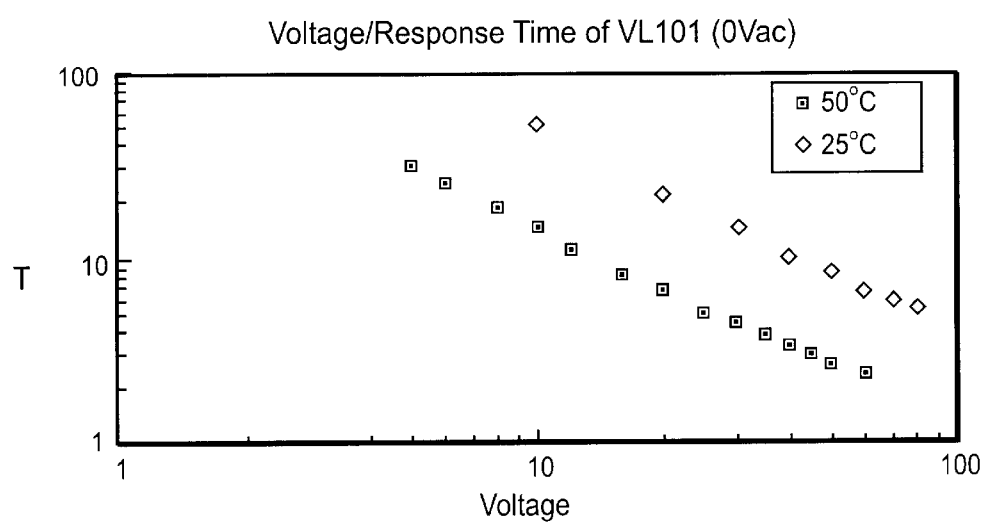
FIG. 5 is a graph plotting voltage/response time of VL101.

According to the present invention, there is provided a liquid crystal composition including a host material comprising (a) two or more phenylpyrimidinyl compounds of the general formula [I]:

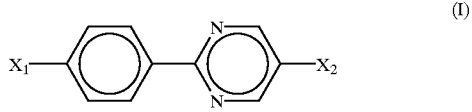

wherein $X_1$ and $X_2$ are independently selected from the group consisting of substituted or unsubstituted, straight or branched chain ($C_1$–$C_{12}$)alkyl, substituted or unsubstituted, straight or branched chain ($C_1$–$C_{12}$)alkenyl and substituted or unsubstituted, straight or branched chain ($C_1$–$C_{12}$)alkoxy (more preferably substituted or unsubstituted, straight or branched chain ($C_5$–$C_{10}$)alkyl, substituted or unsubstituted, straight or branched chain ($C_1$–$C_{12}$)alkenyl and substituted or unsubstituted, straight or branched chain($C_5$–$C_{10}$)alkoxy, and most preferably substituted or unsubstituted, straight or branched chain ($C_7$–$C_9$)alkyl, substituted or unsubstituted, straight or branched chain ($C_7$–$C_9$)alkenyl and substituted or unsubstituted, straight or branched chain($C_7$–$C_9$)alkoxy, and (b) a fluoroterphenyl compound of the formula [II] or [III]:

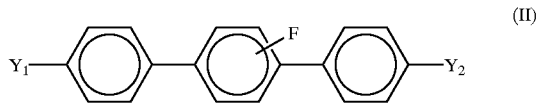

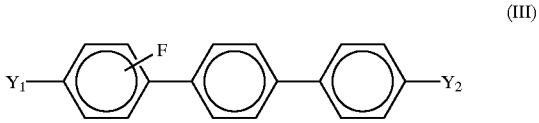

wherein $Y_1$ and $Y_2$ are independently selected from the group consisting of substituted or unsubstituted, straight or branched chain ($C_1$–$C_{12}$)alkyl, substituted or unsubstituted, straight or branched chain ($C_1$–$C_{12}$)alkenyl and substituted or unsubstituted, straight or branched chain ($C_1$–$C_{12}$)alkoxy (more preferably substituted or unsubstituted, substituted or unsubstituted, straight or branched chain ($C_5$–$C_{10}$)alkyl, substituted or unsubstituted, straight or branched chain ($C_1$–$C_{12}$)alkenyl and substituted or unsubstituted, straight or branched chain($C_5$–$C_{10}$)alkoxy, and most preferably substituted or unsubstituted, straight or branched chain ($C_7$–$C_9$) alkyl, substituted or unsubstituted, straight or branched chain ($C_7$–$C_9$)alkenyl and substituted or unsubstituted, straight or branched chain($C_7$–$C_9$)alkoxy).

In the definitions of $X_1$, $X_2$, $Y_1$ and $Y_2$, the alkyl groups are preferably linear. The optional substituent(s) for the alkyl, alkenyl and alkoxy groups may be selected from one or more of halogen (e.g. fluorine, preferably perfluoro), oxygen and siloxane.

The amount of the fluoroterphenyl compound may be in the range of 30 to 60, preferably 45–55, %by weight of the total amount of the phenylpyrimidinyl and fluoroterphenyl compounds.

The above-mentioned phenylpyrimidinyl compounds will sometimes be referred to for convenience under the designation "PYP". Likewise the above-mentioned fluoropterphenyl compounds will sometimes be referred to for convenience under the designation "FTP". Also for convenience, the lengths of the alkyl chains in $X_1$, $X_2$, $Y_1$ and $Y_2$ will sometimes be given by reference to the number of carbon atoms. Thus, for example, 70.9PYP designates a compound of the formula [I] where $X_1$ is the alkoxy group $C_7H_{15}O$ and $X_2$ is the alkyl group $C_9H_{19}$, and 80.5FTP designates a compound of the formula [II] or [III] where $Y_1$ is the alkoxy group $C_8H_{17}O$ and $Y_2$ is the alkyl group $C_5H_{11}$.

In a modification, one or more of the phenyl rings of the fluoroterphenyl compound may be replaced by a dioxane, a pyridine or a pyrimidine ring.

In cases where the liquid crystal composition containing the above-described compounds is not inherently chiral, at least one chiral dopant will normally be included. Said at least one chiral dopant may be used in an amount of above about 1 wt %, more preferably about 5–15 wt %, based on the total weight of the liquid crystal composition. Typical examples of chiral dopants are:

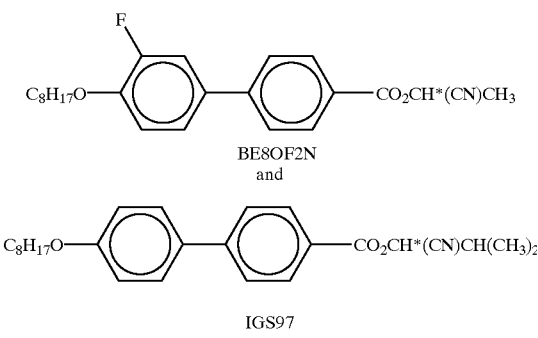

BE8OF2N
and

IGS97

The liquid crystal composition may further include other materials which are per se known in the art, for example for producing improved phase transitions, birefringence, viscosity and cone angle, memory angle and layer tilt.

Also according to the present invention, there is provided a liquid crystal shutter comprising a pair of mutually spaced substrates upon which are provided respective opposed alignment surfaces which are spaced apart, and a layer of liquid crystal composition according to the present invention filling the space between the alignment surfaces.

Such a liquid crystal shutter can be incoporated into a liquid crystal devices where the shutter can be operated by application of a drive voltage across the liquid crystal layer in a manner per se well known in this field of the art. The liquid crystal composition of the present invention is particularly useful in direct drive applications.

The present invention will now be described in further detail in the following Example.

EXAMPLE

A basic PYP host material (AS100) was formulated which comprised 1:2 ratio (by weight) of the following PYP compounds:

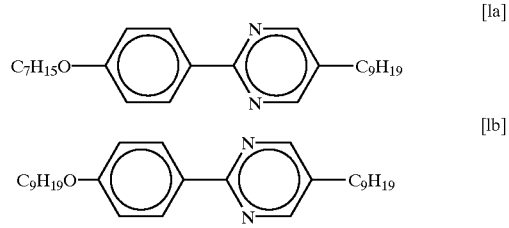

The phase sequence of such material was I 71 N 70 SmA 54 SmC.

When FTP of the formula [IIb]:

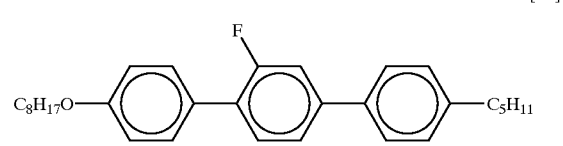

was mixed with AS100 in a weight ratio of 1:1 so as that the compounds of the formulae [Ia], [Ib] and [IIb] were present in respective amounts of 16.67, 33.3 and 50 wt %, the phase sequence of the resultant mixture was I 102.2–100.0 N 90.6 SmA 70.7 SmC, thereby substantially increasing the $T_{A\text{-}C}$ from 54° C. to 70.7° C.

Samples of the above 3-component host material were mixed with the chiral dopant BE80F2N (see above) to produce mixture VL100, a chiral liquid crystal composition containing 10 wt % of BE80FN, and mixture VL101, a chiral liquid crystal composition containing 5 wt % of BE80FN. Various properties of these two mixtures are given below and in the accompanying graphs 1 to 5:

| Mixture | Phase behaviour (° C.) | | | |
|---|---|---|---|---|
| VL100 | I 92.5 N* 86.9 SmA 44.8 SmC* | | | |
| VL101 | I 97 N* 87.1 SmA 59.7 SmC* | | | |

| Mixture | Temp. (° C.) | Ps (nC · cm$^{-2}$) | θ (°) | tau (μs) |
|---|---|---|---|---|
| VL100 | 30 | 16.8 | 14.3 | 8 |
| VL101 | 50 | 6.9 | 13.8 | 8.5 |
| VL101 | 25 | 12.4 | 20.6 | 27 |

[Ps - spotaneous polarisation - measured using Diamant bridge set-up at 30 Hz; θ - cone angle - measured using 50 Hz square wave saturation voltage; tau (pulse width - measured using monopolar pulse method (10 V/μm)]

| Mixture | Temp. (° C.) | tau (μs) |
|---|---|---|
| VL100 | 40 | 11 |
| VL100 | 30 | 20 |
| VL100 | 25 | 29.4 |
| VL101 | 50 | 19 |
| VL101 | 40 | 23.5 |
| VL101 | 30 | 28 |
| VL101 | 25 | 33 |

[tau - 50 Hz square wave response (10–90% transmission) 10 V/μm]

The above data were measured in cells with PI32 alignment. Ps cell spacing nominally 10 μm, θ and tau measured in nominally 2 μm cells.

The so called normal mode of operation is utilised by optical shutters and preferably the compositions of the present invention are used in optical shutters which operate in the normal mode i.e. the relationship between the switching voltage and the response time is substantially linear.

Preferably for use in optical shutters using the normal mode of operation the compositions of the present invention comprise 5%–5% active chiral dopant.

What is claimed is:

1. A liquid crystal shutter operating in the normal mode comprising a pair of mutually spaced substrates upon which are provided respective opposed alignment surfaces which are spaced apart, and a layer of liquid crystal composition filling the space between the alignment surfaces wherein the liquid crystal composition includes a host material comprising (a) two or more phenylpyrimidinyl compounds of the general formula (I):

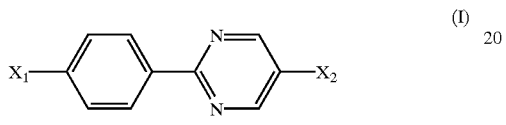

wherein $X_1$ and $X_2$ are independently selected from the group consisting of substituted or unsubstituted, straight or branched chain ($C_1$–$C_{12}$)alkyl, substituted or unsubstituted, straight or branched chain ($C_1$–$C_{12}$)alkenyl and substituted or unsubstituted, straight or branched chain ($C_1$–$C_{12}$) alkoxy, and (b) at least one fluoroterphenyl compound of the formula (II) or (III):

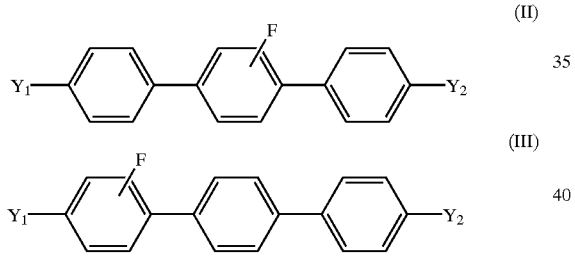

wherein $Y_1$ and $Y_2$ are independently selected from the group consisting of substituted or unsubstituted, straight or branched chain ($C_1$–$C_{12}$) alkyl, substituted or unsubstituted, straight or branched chain ($C_1$–$C_{12}$) alkenyl and substituted or unsubstituted, straight or branched chain ($C_1$–$C_{12}$) alkoxy, and further includes at least one chiral dopant.

2. A shutter according to claim 1, wherein in the host material of the liquid crystal composition one or more of the phenyl rings of the fluoroterphenyl compound is/are replaced by a pyrimidine, a dioxane, a pyridine or a cyclohexane ring.

3. A shutter as claimed in claim 1, wherein $X_1$, $X_2$, $Y_1$ and $Y_2$ are independently selected from substituted or unsubstituted ($C_5$–$C_{10}$) alkyl, substituted or unsubstituted ($C_5$–$C_{10}$) alkenyl and substituted or unsubstituted ($C_5$–$C_{10}$) alkoxy.

4. A shutter as claimed in claim 1 wherein $X_1$ and $X_2$ are independently selected from substituted or unsubstituted ($C_7$–$C_9$) alkyl, substituted or unsubstituted ($C_7$–$C_9$) alkenyl and substituted or unsubstituted ($C_7$–$C_9$) alkoxy.

5. A shutter as claimed in claim 1 wherein $Y_1$ and $Y_2$, are independently selected from substituted or unsubstituted ($C_5$–$C_8$) alkyl, substituted or unsubstituted ($C_5$–$C_8$) alkenyl and substituted or unsubstituted ($C_5$–$C_8$) alkoxy.

6. A shutter as claimed in claim 1 wherein, in $X_1$, $X_2$, $Y_1$ and $Y_2$, the alkyl groups are linear.

7. A shutter as claimed in claim 1 wherein the amount of the fluoroterphenyl compound is in the range of 30–60% by weight of the total amount of the phenylpyrimidinyl and fluoroterphenyl compounds.

8. A liquid crystal shutter operating in the normal mode comprising a pair of mutually spaced substrates upon which are provided respective opposed alignment surfaces which are spaced apart, and a layer of liquid crystal composition filling the space between the alignment surfaces, wherein the liquid crystal composition includes (1) a host material comprising (a) two or more phenylpyrimidinyl compounds of the general formula (I):

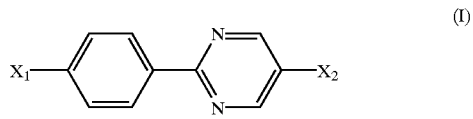

wherein $X_1$ and $X_2$ are independently selected from the group consisting of substituted or unsubstituted, straight or branched chain ($C_1$–$C_{12}$)alkyl, substituted or unsubstituted, straight or branched chain ($C_1$–$C_{12}$) alkenyl and substituted or unsubstituted, straight or branched chain ($C_1$–$C_{12}$) alkoxy, and (b) at least one fluoroterphenyl compound of the formula (II) or (III):

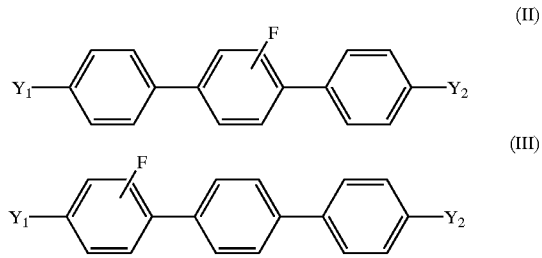

wherein $Y_1$ and $Y_2$ are independently selected from the group consisting of substituted or unsubstituted, straight or branched chain ($C_1$–$C_{12}$) alkyl, substituted or unsubstituted, straight or branched chain ($C_1$–$C_{12}$) alkenyl and substituted or unsubstituted, straight or branched chain ($C_1$–$C_{12}$) alkoxy, and (2) at least one chiral dopant is present in an amount of about 1 to 15 wt % based on the total weight of the liquid crystal composition.

9. A shutter as claimed in claim 8 herein said at least one chiral dopant is present in an amount of 5 to 15 wt % based on the total weight of the liquid crystal composition.

10. A method of increasing the temperature at which the transition from the smectic A phase to the smectic C phase occurs in a liquid crystal shutter operating in the normal mode comprising a pair of mutually spaced substrates upon which are provided respective opposed alignment surfaces which are spaced apart, and a layer of liquid crystal composition filling the space between the alignment surfaces comprising employing a liquid crystal composition which includes a host material comprising (a) two or more phenylpyrimidinyl compounds of the general formula (I):

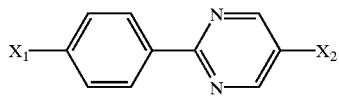
(I)

wherein $X_1$ and $X_2$ are independently selected from the group consisting of substituted or unsubstituted, straight or branched chain ($C_1$–$C_{12}$)alkyl, substituted or unsubstituted, straight or branched chain ($C_1$–$C_{12}$)alkenyl and substituted or unsubstituted, straight or branched chain ($C_1$–$C_{12}$) alkoxy, and (b) at least one fluoroterphenyl compound of the formula (II) or (III):

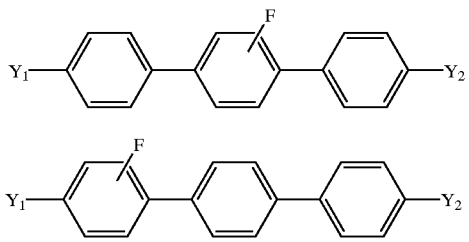
(II)

(III)

wherein $Y_1$ and $Y_2$ are independently selected from the group consisting of substituted or unsubstituted, straight or branched chain ($C_1$–$C_{12}$) alkyl, substituted or unsubstituted, straight or branched chain ($C_1$–$C_{12}$) alkenyl and substituted or unsubstituted, straight or branched chain ($C_1$–$C_{12}$) alkoxy, and further includes at least one chiral dopant.

11. A method according to claim 10 wherein in the host material of the liquid crystal composition one or more of the phenyl rings of the fluoroterphenyl compound is/are replaced by a pyrimidine, a dioxane, a pyridine or a cyclohexane ring.

12. A method as claimed in claim 10 wherein $X_1$, $X_2$, $Y_1$ and $Y_2$ are independently selected from substituted or unsubstituted ($C_5$–$C_{10}$) alkyl, substituted or unsubstituted ($C_5$–$C_{10}$) alkenyl and substituted or unsubstituted ($C_5$–$C_{10}$) alkoxy.

13. A method as claimed in claim 10 wherein $X_1$ and $X_2$ are independently selected from substituted or unsubstituted ($C_7$–$C_9$) alkyl, substituted or unsubstituted ($C_7$–$C_9$) alkenyl and substituted or unsubstituted ($C_7$–$C_9$) alkoxy.

14. A method as claimed in claim 10 wherein $Y_1$, and $Y_2$, are independently selected from substituted or unsubstituted ($C_5$–$C_8$) alkyl, substituted or unsubstituted ($C_5$–$C_8$) alkenyl and substituted or unsubstituted ($C_5$–$C_8$) alkoxy.

15. A method as claimed in claim 10 wherein, in $X_1$, $X_2$, $Y_1$ and $Y_2$, the alkyl groups are linear.

16. A method as claimed in claim 10 wherein the amount of the fluoroterphenyl compound is in the range of 30–60% by weight of the total amount of the phenylpyrimidinyl and fluoroterphenyl compounds.

17. A method as claimed in claim 10 wherein said at least one chiral dopant is present in an amount of about 1 to 15 wt % based on the total weight of the liquid crystal composition.

18. A method as claimed in claim 17 wherein said at least one chiral dopant is present in an amount of 5 to 15 wt % based on the total weight of the liquid crystal composition.

* * * * *